United States Patent
Montero

(10) Patent No.: US 9,519,320 B2
(45) Date of Patent: Dec. 13, 2016

(54) SYSTEMS AND METHODS FOR CONTROL OF A CLOSED-LOOP SYSTEM

(71) Applicant: Dell Products L.P., Round Rock, TX (US)

(72) Inventor: Adolfo Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 670 days.

(21) Appl. No.: 13/772,082

(22) Filed: Feb. 20, 2013

(65) Prior Publication Data
US 2014/0233176 A1    Aug. 21, 2014

(51) Int. Cl.
*G06F 19/00*    (2011.01)
*G06F 1/20*    (2006.01)

(52) U.S. Cl.
CPC ..................... *G06F 1/206* (2013.01)

(58) Field of Classification Search
USPC ............. 700/114, 276, 186, 44; 702/19
See application file for complete search history.

(56) References Cited

U.S. PATENT DOCUMENTS

| | | | | |
|---|---|---|---|---|
| 4,586,893 A * | 5/1986 | Somerville | ............ | F23N 1/022 123/672 |
| 4,732,318 A * | 3/1988 | Osheroff | ............ | F24F 3/0442 165/217 |
| 5,447,586 A * | 9/1995 | Tam | ............ | B29C 53/8041 156/169 |
| 5,933,313 A * | 8/1999 | Furukawa | ............ | G05B 11/28 361/152 |
| 2003/0153986 A1* | 8/2003 | Salsbury | ............ | G05B 11/28 700/11 |
| 2007/0124574 A1* | 5/2007 | Goldberg | ............ | G06F 1/206 713/100 |

* cited by examiner

*Primary Examiner* — Kidest Bahta
(74) *Attorney, Agent, or Firm* — Jackson Walker L.L.P.

(57) ABSTRACT

In accordance with embodiments of the present disclosure, a system may include a feedback controller and a comparator. The feedback controller may be configured to, based on a setpoint value and a measured process value calculate a first difference between the setpoint value and the measured process value and generate a controller driving signal based on the first difference. The comparator may be configured to compare a second difference between the setpoint value and a previous setpoint value to a predetermined threshold, determine if a magnitude of the second difference is greater than the predetermined threshold, output as an output driving signal the controller driving signal if the magnitude is not greater than the predetermined threshold, and output as the output driving signal a setpoint driving signal if the magnitude is greater than the predetermined threshold, the setpoint value based on the setpoint value independent of the measured process value.

18 Claims, 2 Drawing Sheets

SYSTEMS AND METHODS FOR CONTROL OF A CLOSED-LOOP SYSTEM

TECHNICAL FIELD the present disclosure relates in general to information handling systems, and more particularly controlling a closed-loop system (e.g., an air mover and an associated closed-loop control system within an information handling system).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

Often, the operation of an air mover (e.g., rotational speed of air movers) is controlled by a proportional-integral-differential (PID) closed-loop control system. Typical PID closed-loop control is based on a mathematical equation summing proportional, integral, and differential terms of the variable (e.g., air mover speed) being controlled. Traditional PID control implementations are prone to oscillation and excessive lag if not tuned correctly. Oscillation occurs when a PID controller repeatedly makes changes that are too large and repeatedly overshoots a target variable setpoint, meaning that a system output would oscillate around the setpoint in either a constant, growing, or decaying sinusoid. If the oscillations increase with time then the system is unstable, whereas if they decrease the system is stable. If the oscillations remain at a constant magnitude the system is marginally stable. When PID control is used to control an air mover, oscillation may be audibly noticeable to an end user.

Lag occurs when a significant change in a setpoint for a PID controller occurs, and the PID controller requires significant time to correct the system output to match the new set point. When used to control operation of an air mover, PID control may not respond quickly enough to prevent undesirable thermal increases.

In addition to these disadvantages of PID control as applied to control of air movers, such disadvantages may also be present in other applications of PID control.

SUMMARY

In accordance with the teachings of the present disclosure, the disadvantages and problems associated with control of a closed-loop system may be substantially reduced or eliminated.

In accordance with embodiments of the present disclosure, a system may include a feedback controller and a comparator. The feedback controller may be configured to, based on a setpoint value and a measured process value calculate a first difference between the setpoint value and the measured process value and generate a controller driving signal based on the first difference. The comparator may be configured to compare a second difference between the setpoint value and a previous setpoint value to a predetermined threshold, determine if a magnitude of the second difference is greater than the predetermined threshold, output as an output driving signal the controller driving signal if the magnitude is not greater than the predetermined threshold, and output as the output driving signal a setpoint driving signal if the magnitude is greater than the predetermined threshold, the setpoint value based on the setpoint value independent of the measured process value.

In accordance with these and other embodiments a method may include calculating a first difference between a setpoint value and a measured process value. The method may also comprise generating a controller driving signal based on the first difference. The method may additionally include comparing a second difference between the setpoint value and a previous setpoint value to a predetermined threshold. The method may further include determining if a magnitude of the second difference is greater than the predetermined threshold. The method may also include outputting as an output driving signal the controller driving signal if the magnitude is not greater than the predetermined threshold. The method may additionally include outputting as the output driving signal a setpoint driving signal if the magnitude is greater than the predetermined threshold, the setpoint value based on the setpoint value independent of the measured process value.

In accordance with these and other embodiments of the present disclosure, an information handling system may include an air mover and an air mover control system configured to control a velocity of the air mover. The air mover control system may be configured to based on a measured temperature, determine a setpoint velocity. In addition, the air mover control system may, based on the setpoint velocity and a measured velocity of the air mover, calculate a first difference between the setpoint velocity and the measured velocity and generate a controller air mover driving signal based on the first difference. The air mover control system may also be configured to compare a second difference between the setpoint velocity and a previous setpoint velocity to a predetermined threshold. The air mover control system may further be configured to determine if a magnitude of the second difference is greater than the predetermined threshold. The air mover control system may additionally be configured to communicate to the air mover as an air mover driving signal the controller air mover driving signal if the magnitude is not greater than the predetermined threshold. The air mover control system may also be configured to communicate to the air mover as the air mover driving signal a setpoint air mover driving signal if the magnitude is greater than the predetermined threshold, the setpoint air mover driving signal based on the setpoint velocity independent of the measured velocity.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
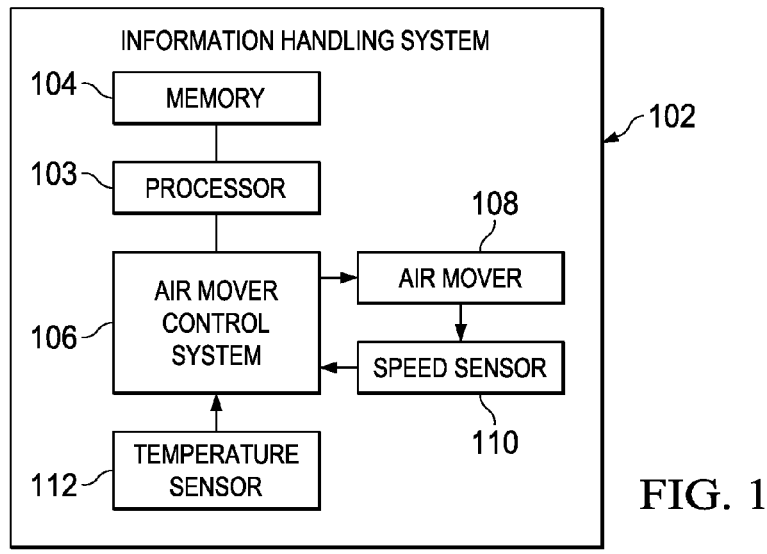
FIG. 1 illustrates a block diagram of an example information handling system, in accordance with the present disclosure.
Figure 3:
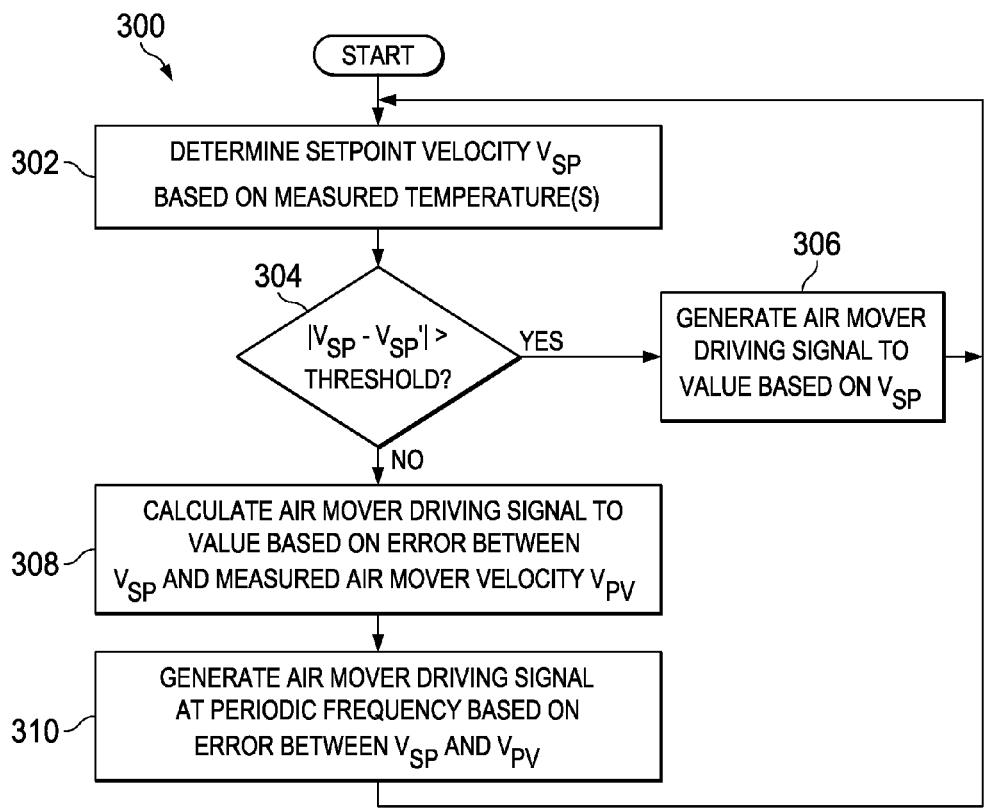
FIG. 3 illustrates a flow chart of an example method for air mover control, in accordance with the present disclosure.
Figure 2:
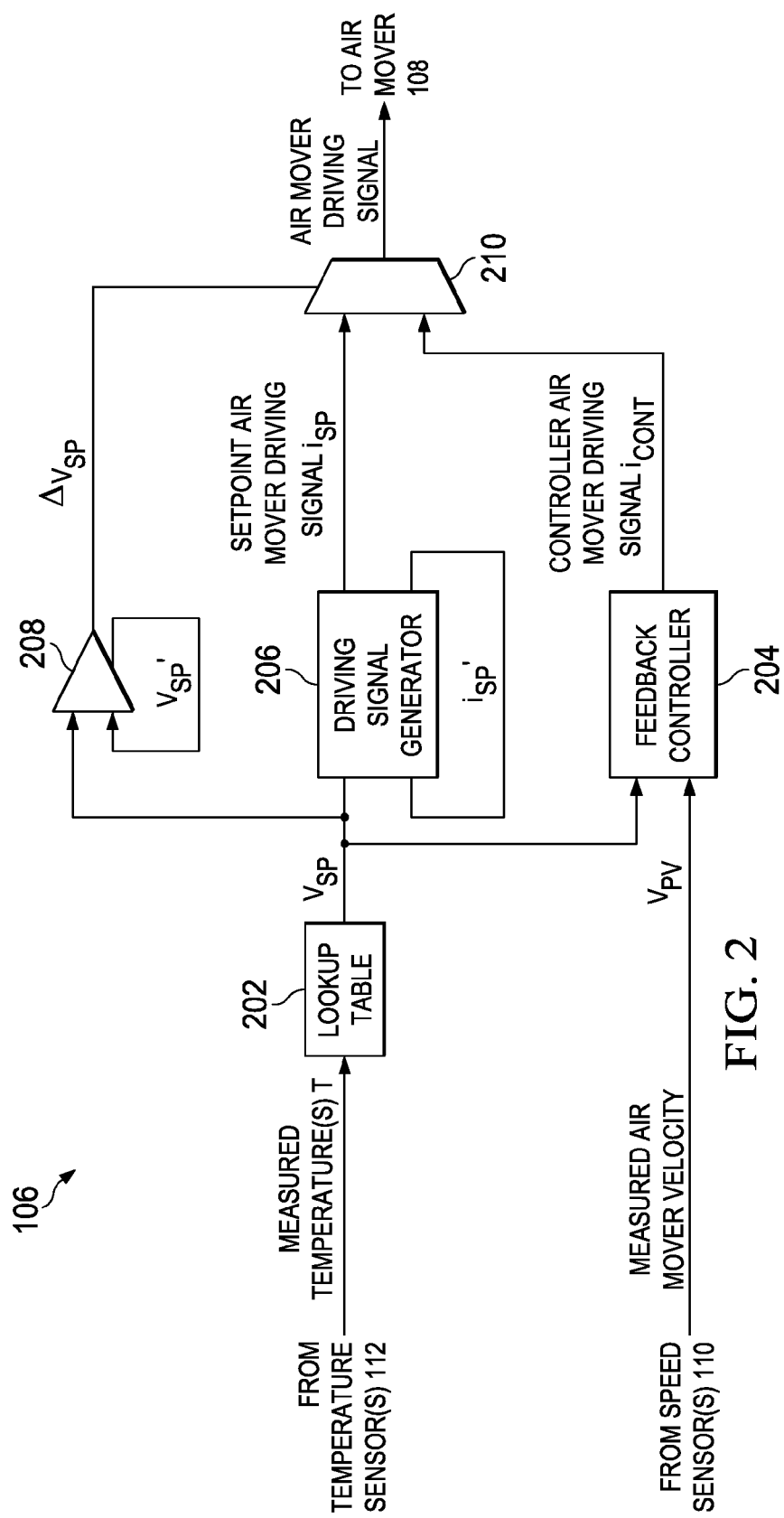
FIG. 2 illustrates a block diagram of an example air mover control system, in accordance with the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, busses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, an information handling system 102 may comprise a server chassis configured to house a plurality or servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, an information handling system 102 may comprise a processor 103, a memory 104, an air mover control system 106, an air mover 108, a speed sensor 110 and a temperature sensor 112.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Air mover control system 106 may be communicatively coupled to processor 103 and may include any system, device, or apparatus configured to receive one or more signals indicative of a one or more temperatures within information handling system 102 (e.g., one or more signals from one or more temperature sensors 112) and/or a signal indicative of a speed of air mover 108 (e.g., a signal from speed sensor 110), and based on such signals, calculate an air mover driving signal to maintain an appropriate level of cooling, increase cooling, or decrease cooling, as appropriate, and communicate such air mover driving signal to air mover 108.

Air mover 108 may be communicatively coupled to air mover control system 106, and may include any mechanical or electro-mechanical system, apparatus, or device operable to move air and/or other gasses. In some embodiments, air mover 108 may comprise a fan (e.g., a rotating arrangement of vanes or blades which act on the air). In other embodiments, air mover 108 may comprise a blower (e.g., centrifugal fan that employs rotating impellers to accelerate air received at its intake and change the direction of the airflow).

In these and other embodiments, rotating and other moving components of air mover 108 may be driven by a motor. The rotational speed of such motor may be controlled by the air mover control signal communicated from air mover control system 106. In operation, air mover 108 may cool information handling resources of information handling system 102 by drawing cool air into an enclosure housing the information handling resources from the outside the chassis, expel warm air from inside the enclosure to the outside of such enclosure, and/or move air across one or more heatsinks (not explicitly shown) internal to the enclosure to cool one or more information handling resources.

Speed sensor 110 may be communicatively coupled to air mover 110, and may include any system, device, or apparatus capable of sensing the speed (e.g., revolutions per minute) of a rotational component of air mover 108 (e.g., fan, rotor, impeller, motor, etc.) and communicating a signal indicative of such sensed speed to air mover control system 106. In some embodiments, speed sensor 110 may comprise a Hall effect sensor (e.g., a transducer that varies its output voltage in response to a magnetic field, such magnetic field created by a magnetic element present in air mover 108).

A temperature sensor 112 may be any system, device, or apparatus (e.g., a thermometer, thermistor, etc.) configured to communicate a signal to air mover speed controller 106 indicative of a temperature within information handling system 102.

For ease of exposition, FIG. 1 depicts only one each of air mover control system 106, air mover 108, speed sensor 110, and temperature sensor 112. However, it is noted that information handling system 102 may include two or more air movers 108 and each such air mover 108 may have a dedicated respective air mover control system 106 and/or a dedicated respective speed sensor 110. It is further noted that an air mover control system 106 may receive temperature signals from one or more temperature sensors 112, and that a single temperature sensor 112 may communicate temperature signals to one or more air mover control systems 106.

In addition to processor 103, memory 104, air mover control system 106, air mover 108, speed sensor 110, and temperature sensor 112, information handling system 102 may include one or more other information handling resources.

FIG. 2 illustrates a block diagram of an example air mover control system 106, in accordance with the present disclosure. As shown in FIG. 2, air mover control system 106 may comprise a lookup table 202, a feedback controller 204, a driving signal generator 206, a comparator 208, and a multiplexer 210. Such components of air mover control system 106 may be implemented in hardware, software, firmware, or any combination thereof.

Lookup table 202 may include any suitable table, map, database, or other data structure that associates one or more measured temperatures (e.g., communicated from one or more temperature sensors 112) to corresponding air mover setpoint velocities. Thus, based on one or more temperatures sensed by one or more temperature sensors 112, air mover control system 106 may determine a setpoint velocity $v_{SP}$ for air mover 108.

Feedback controller 204 may comprise any system, device, or apparatus configured to, based on a setpoint velocity $v_{SP}$ and a measured air mover velocity $v_{PV}$, generate a controller air mover driving signal $i_{CONT}$. In some embodiments, feedback controller 204 may dynamically modify the tentative air mover driving signal based on a calculated difference or error between the setpoint velocity $v_{SP}$ and the measured air mover velocity $v_{PV}$. In some embodiments, controller air mover driving signal $i_{CONT}$ may comprise a pulse-width modulation (PWM) signal, in which the width of a pulse of a periodic square wave signal may be indicative of a desired operating velocity for air mover 108. In addition or alternatively, feedback controller 204 may update the controller air mover driving signal $i_{CONT}$ at a periodic frequency based on the setpoint velocity $v_{SP}$ and the measured air mover velocity $v_{PV}$, as described elsewhere in this disclosure. For example, the periodic frequency of update may be higher when the magnitude of error between the setpoint velocity $v_{SP}$ and the measured air mover velocity $v_{PV}$ is larger (e.g., updating eight times per second when the error is more than 500 RPM), and the periodic frequency of update may be lower when the magnitude of error between the setpoint velocity $v_{SP}$ and the measured air mover velocity $v_{PV}$ is smaller (e.g., updating once every two seconds when the error is less than 100 RPM). Because such update frequency is a function of the magnitude of the error, the oscillation present in traditional feedback controllers (e.g., PID controllers) may be reduced or eliminated.

Driving signal generator 206 comprise any system, device, or apparatus configured to, based on a setpoint velocity $v_{SP}$, generate a setpoint air mover driving signal $i_{SP}$ that may be received by air mover 108. In some embodiments, setpoint air mover driving signal $i_{SP}$ may comprise a pulse-width modulation (PWM) signal, in which the width of a pulse of a periodic square wave signal may be indicative of a desired operating velocity for air mover 108. In some embodiments, driving signal generator 206 may include a lookup table (e.g., a table, map, database, or other structure) that associates one or more values of setpoint velocity $v_{SP}$ (e.g., communicated from lookup table 202) to corresponding setpoint air mover driving signals $i_{SP}$. In such embodiments, driving signal generator 206 may lookup the value of a setpoint velocity $v_{SP}$ received at its input and generate a setpoint air mover driving signal $i_{SP}$ corresponding thereto. Alternatively in such embodiments, driving signal generator 206 may ramp (e.g., monotonically increase or decrease) from a previous setpoint air mover driving signal $i_{SP}'$ to the setpoint air mover driving signal $i_{SP}$ corresponding to the setpoint velocity $v_{SP}$ received at its input. Such ramping may prevent a substantially instantaneous change in the actual velocity of air mover 108, which may be audibly noticeable to a user.

Comparator 208 may comprise any system, device, or apparatus configured based on a setpoint velocity $v_{SP}$ and a previous setpoint velocity $v_{SP}'$, determine if the value of the setpoint velocity has changed more than a predetermined threshold. If the value of the setpoint velocity has changed more than a predetermined threshold, comparator 208 may generate a delta signal $\Delta_{VSP}$ indicating such change.

Multiplexer 210 may comprise any system, device, or apparatus that, based on a received control signal (e.g., delta signal $\Delta_{VSP}$) selects one of several input signals and forwards the selected input as an output signal onto the output signal line or bus, as described in greater detail below. Specifically, if delta signal $\Delta_{VSP}$ indicates a change in the setpoint velocity $v_{SP}$, multiplexer may forward setpoint air mover driving signal $i_{SP}$ as the air mover driving signal to be communicated to air mover 108. On the other hand, if delta signal $\Delta_{VSP}$ does not a change in the setpoint velocity $v_{SP}$, multiplexer may forward controller air mover driving signal $i_{CONT}$ as the air mover driving signal to be communicated to air mover 108. Accordingly, in the event of a significant change in setpoint velocity $V_{SP}$, feedback controller 204 is bypassed and the air mover driving signal is set directly based on the setpoint velocity $v_{SP}$, thus potentially reducing lag inherent in feedback controller 204.

FIG. 3 illustrates a flow chart of an example method 300 for air mover control, in accordance with the present disclosure. According to one embodiment, method 300 may begin at step 302. As noted above, teachings of the present disclosure may be implemented in a variety of configurations of information handling system 102 and/or air mover control system 106. As such, the preferred initialization point for method 300 and the order of the steps comprising method 200 may depend on the implementation chosen.

At step 302, air mover control system 106 or another component of information handling system 102 may determine a setpoint velocity $v_{SP}$ based on one or more measured temperatures (e.g., received from one or more temperature sensors 112). At step 304, air mover control system 106 or another component of information handling system 102 may determine if the magnitude of the difference between the setpoint velocity $v_{SP}$ and a previous setpoint velocity $V_{SP}'$ is greater than a predetermined threshold. If the magnitude of the difference between the setpoint velocity $v_{SP}$ and a previous setpoint velocity $v_{SP}'$ is greater than a predetermined threshold, method 300 may proceed to step 306. Otherwise, method 300 may proceed to step 208.

At step 306, in response to a determination that the magnitude of the difference between the setpoint velocity $V_{SP}$ and a previous setpoint velocity $v_{SP}'$ is greater than a predetermined threshold, air mover control system 106 or another component of information handling system 102 may generate an air mover driving signal at a value based on the setpoint velocity $v_{SP}$ (e.g., the setpoint air mover driving signal $i_{SP}$, thus bypassing feedback controller 204). After completion of step 306, method 300 may proceed again to step 302.

At step 308, in response to a determination that the magnitude of the difference between the setpoint velocity $V_{SP}$ and a previous setpoint velocity $v_{SP}'$ is not greater than the predetermined threshold, air mover control system 106 or another component of information handling system 102 may calculate an air mover driving signal at a value based on an error between the setpoint velocity $v_{SP}$ and a measured air mover velocity $v_{PV}$.

At step 310, air mover control system 106 or another component of information handling system 102 may generate the calculated air mover driving signal at a periodic frequency based on the error between the setpoint velocity $V_{SP}$ and a measured air mover velocity $v_{PV}$. After completion of step 310, method 300 may proceed again to step 302.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102, air mover control system 106, or any other system operable to implement method 300. In certain embodiments, method 300 may be implemented partially or fully in software and/or firmware embodied in computer-readable media.

Although the foregoing discussion contemplated application systems and methods for closed-loop control to operation of an air mover, similar methods and systems may be generalized and applied to other closed loop controls. For example, such similar methods and systems may be applied to generate a driving signal to any appropriate component based on any measured process value other than a measured velocity and a setpoint value other than a setpoint velocity.

Although the present disclosure has been described in detail, it should be understood that various changes, substitutions, and alterations can be made hereto without departing from the spirit and the scope of the disclosure as defined by the appended claims.

What is claimed is:

1. A system comprising:
   an air mover configured to move air in accordance with an air mover driving signal;
   a feedback controller configured to, based on a setpoint value and a measured process value:
      calculate a first difference between the setpoint value and the measured process value;
      generate a controller driving signal based on the first difference; and
      generate a setpoint driving signal based on the setpoint value independent of the measured process value;
   a comparator configured to:
      calculate a second difference comprising a difference between the setpoint value and a previous setpoint value;
      compare a magnitude of the second difference to a particular threshold;
      select, based on the compare, between the controller driving signal and the setpoint driving signal as an output driving signal; and
      providing the output driving signal as the air mover driving signal to the air mover to cause the air mover to move air in accordance with the air mover driving signal.

2. The system of claim 1, wherein the output driving signal is a driving signal for controlling a rotational velocity of an air mover.

3. The system of claim 2, wherein the setpoint value is a setpoint velocity for the air mover.

4. The system of claim 3, wherein the setpoint velocity is based on a measured temperature.

5. The system of claim 2, wherein the output driving signal is a pulse width modulation signal.

6. The system of claim 1, wherein the feedback controller is configured to generate the setpoint driving signal by ramping a value of the setpoint driving signal from a previous value to a present value.

7. The system of claim 1, wherein outputting the controller driving signal as the output driving signal comprises updating the controller driving signal at a periodic frequency based on the first difference.

8. An air moving method comprising:
   performing, by an air mover control system of an information handling system including an air mover, operations including:
      calculating a first difference between a setpoint value and a measured process value; and
      generating a controller driving signal based on the first difference;
      generating a setpoint driving signal based on the setpoint value independent of the measured process value;
      calculating a second difference between the setpoint value and a previous setpoint value;
      determining if a magnitude of the second difference is greater than a particular threshold;
      selecting, based on said determining, between the controller driving signal and the setpoint driving signal as an output driving signal; and providing the output driving signal as an air mover driving signal to the air mover to cause the air mover to move air.

9. The method of claim 8, wherein the air mover driving signal for controlling a rotational velocity of the air mover.

10. The method of claim 8, wherein the setpoint value is a setpoint velocity for the air mover.

11. The method of claim 10, wherein the setpoint velocity is based on a measured temperature.

12. The method of claim 9, wherein the output driving signal is a pulse width modulation signal.

13. The method of claim 8, wherein outputting the setpoint driving signal as the output driving signal comprises ramping the setpoint driving signal from a previous setpoint value to the setpoint value.

14. The method of claim 8, wherein outputting the controller driving signal as the output driving signal comprises updating the controller driving signal at a periodic frequency based on the first difference.

15. An information handling system comprising:
   an air mover including an input coupled to an air mover driving signal;
   an air mover control system to control a velocity of the air mover, the air mover control system comprising:
      a lookup table configured to receive a measured temperature from a temperature sensor, and determine a setpoint velocity in accordance with the measured temperature;
      a feedback controller configured to:
         receive a setpoint velocity from the lookup table and a measured velocity from a speed sensor;
         calculate a first difference between the setpoint velocity and the measured velocity; and
         generate a first driving signal based on the first difference;
      a comparator configured to:
         receive a second driving signal based on the setpoint velocity independent of the measured velocity; and
         determine a second difference between the setpoint velocity and a previous setpoint velocity; and
      a multiplexer configured to select, based on a comparison between a magnitude of the second difference and a predetermined threshold, either the first driving signal or the second driving signal as an air mover driving signal;
      wherein the air mover is configured to move air in accordance with the air mover driving signal.

16. The information handling system of claim 15, wherein the air mover driving signal is a pulse width modulation signal.

17. The information handling system of claim 15, wherein generating the second driving signal comprises ramping the second driving signal from a previous value of the second driving signal to a current value of the second driving signal.

18. The information handling system of claim 15, wherein the air mover control system is configured to update the first driving signal at a periodic frequency based on the first difference.

* * * * *